United States Patent
Centen et al.

(10) Patent No.: US 7,486,316 B2
(45) Date of Patent: Feb. 3, 2009

(54) IMAGE PICKUP DEVICE

(75) Inventors: Petrus Gijsbertus Maria Centen, Goirle (NL); Cornelis Johannes Maria Nelen, Bergen op Zoom (NL)

(73) Assignee: Thomas Licensing, Boulogne Billancourt (FR)

( * ) Notice: Subject to any disclaimer, the term of this patent is extended or adjusted under 35 U.S.C. 154(b) by 739 days.

(21) Appl. No.: 10/723,553

(22) Filed: Nov. 26, 2003

(65) Prior Publication Data

US 2004/0109073 A1    Jun. 10, 2004

(30) Foreign Application Priority Data

Dec. 6, 2002    (EP) .................................. 02293012

(51) Int. Cl.
*H04N 5/217* (2006.01)
*H04N 5/235* (2006.01)
*H04N 5/228* (2006.01)
*H04N 3/14* (2006.01)
*H04N 5/335* (2006.01)

(52) U.S. Cl. ...................... 348/241; 348/311; 348/312; 348/300; 348/229.1; 348/222.1

(58) Field of Classification Search ............. 348/229.1, 348/312, 300, 222.1, 362, 248, 249, 250, 348/311–314
See application file for complete search history.

(56) References Cited

U.S. PATENT DOCUMENTS

| 4,635,126 | A | * | 1/1987 | Kinoshita ................... 348/297 |
| 4,683,498 | A | * | 7/1987 | Topper ....................... 348/302 |
| 4,860,095 | A | * | 8/1989 | Kimura et al. ................ 348/65 |
| 5,528,291 | A | * | 6/1996 | Oda ........................ 348/220.1 |
| 5,986,705 | A | * | 11/1999 | Shibuya et al. .............. 348/362 |
| 6,084,632 | A | * | 7/2000 | Inuiya et al. ............. 348/227.1 |
| 6,958,776 | B2 | * | 10/2005 | Mendis et al. .............. 348/308 |

OTHER PUBLICATIONS

Patent Abstract of Japan; vol. 014, No. 028, Jan. 19, 1990 & JP 01 264481 A, Oct. 20, 1989.
Patent Abstract of Japan; vol. 018, No. 455, Aug. 24, 1994 & JP 06 141328A, May 20, 1994.
Yamada T et al.: "Driving Voltage Reduction in a Two-Phase CCD by Suppression of Potential Pockets in Inter-Electrode Gaps"; vol. 44 No. 10, Oct. 1, 1997 pp. 1580-1587.

* cited by examiner

*Primary Examiner*—David L Ometz
*Assistant Examiner*—Richard M Bemben
(74) *Attorney, Agent, or Firm*—Joseph J. Lake; Harvey D. Fried; Patricia Verlangieri

(57) ABSTRACT

An image pickup device has an image sensor generating an image signal, a pulse pattern generator generating a driving signal for the image sensor and an amplifier for amplifying the image signal with a given gain, which can be adjusted by the user. The power of the driving signal is controlled depending on the gain. For instance, the pulse height of the driving signal is set depending on the gain.

12 Claims, 2 Drawing Sheets

IMAGE PICKUP DEVICE

FIELD OF THE INVENTION

The invention relates to an image pickup device, notably a camera.

BACKGROUND OF THE INVENTION

An image pickup device, for instance a still-picture camera or a video camera, has an image sensor, which generates an electrical signal (image signal) describing the light impinging on the image sensor, i.e. an image of the scene facing the image sensor.

The image sensor is fed by a pulse pattern generator, which generates driving signals (operating voltages and various clocks) needed for operation of the image sensor.

Before being processed, the image signal generated by the image sensor is amplified at a gain, which is directly or indirectly selected by the user of the image receiver through adjusting means.

Image sensors are generally designed to handle overexposure, up to a value called maximum charge handling capacity $Q_{max}$, for instance 400%. At high gain settings, this overexposure capability leads to huge values (at 12 dB, 1 600%) of the amplified signal, thereby generating unacceptable ringing and streaking. Furthermore, high gain also implies more noise in the amplified signal.

SUMMARY OF THE INVENTION

In order to solve these problems, the invention proposes an image pickup device comprising an image sensor generating an image signal, driving means generating a driving signal for the image sensor, an amplifier for amplifying the image signal with a given gain, adjusting means to set the gain and control means to control the power of the driving signal depending on the gain.

As the power of the driving signal (and notably the height of the pulses of the driving signal) determines the maximum generated charge and hence the maximum output signal, control of the power of the driving signal makes it possible to lower the maximum possible signal at high gains, and therefore to reduce ringing and streaking.

This reduction of the maximum possible signal has no consequence for the user at high gains as it relates to overexposed parts, which are supposedly not of interest when the gain is set high.

According to preferred features of the invention:
a pulse pattern generator includes the driving means;
the pulse pattern generator includes the control means;
a controller comprises the control means;
the driving signal is a storage clock signal or an image clock signal;
the image sensor is a CCD imager;
the image pickup device comprises two further image sensors;
the control means sets the height of pulses of the driving signal.

The invention thus proposes an image pickup device comprising an image sensor generating an image signal, driving means generating a signal with pulses for driving the image sensor, an amplifier for amplifying the image signal with a given gain, adjusting means to set the gain and control means to set the pulse height depending on the gain.

Preferably, the driving signal is a storage clock signal or an image clock signal.

BRIEF DESCRIPTION OF THE DRAWINGS

Other features of the invention appear from the following description made in light of the appended drawings where.

DETAILED DESCRIPTION OF PREFERED EMBODIMENTS

Figure 1:
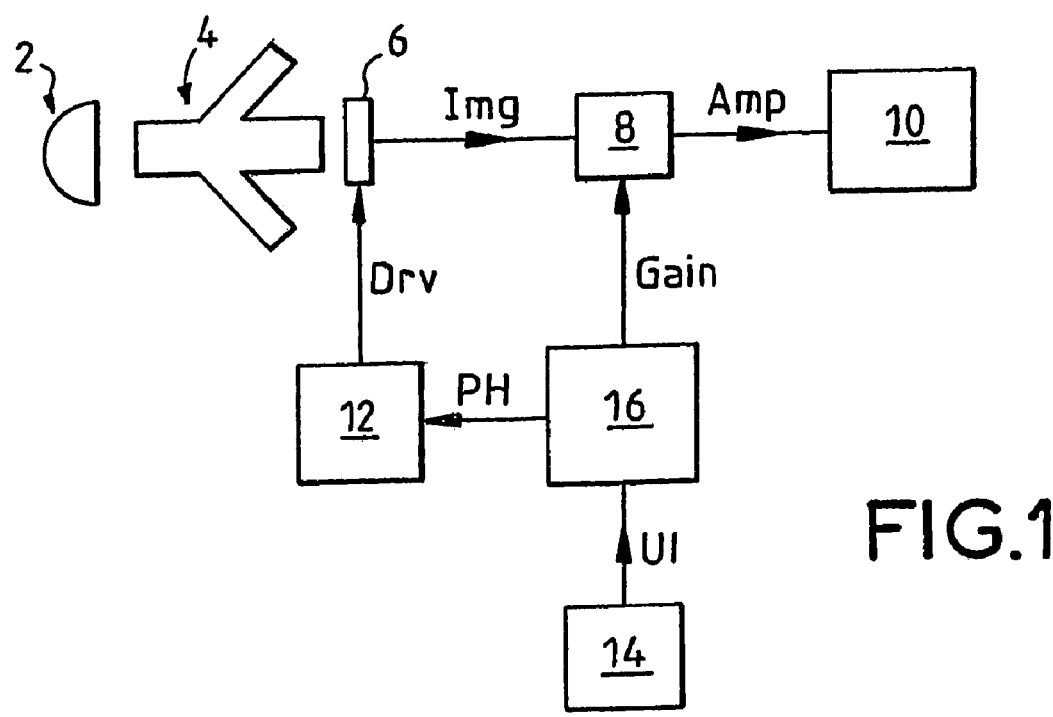
FIG. 1 depicts an embodiment of the invention.

FIG. 1 represents the main elements of a video camera according to the invention. This video camera is a colour video camera with 3 image sensors (3 CCD imagers) and corresponding processing channels, but only 1 image sensor and its corresponding processing channel have been represented for the sake of conciseness. The invention similarly applies to the other 2 channels.

Optical means 2 (here represented as a lens) directs incoming light to CCD imagers (image sensors) through a colour separator 4, and notably to a CCD imager referenced 6.

A pulse pattern generator 12 supplies various operating voltages and clocks (for instance an image clock and a storage clock), generally denominated driving signals Drv, to the CCD imager 6. Thanks to these driving signals Drv provided by the pulse pattern generator 12, the CCD imager 6 generates an image signal Img representing the quantity of light received by the CCD image 6 on each of its pixel element.

The image signal Img is transmitted to an amplifier 8, which outputs an amplified image signal Amp. The amplified image signal Amp is received at a processing stage 10, where it is processed and/or recorded on a medium and/or broadcast to other users. The processing stage 10 also receives amplified signals from the other 2 colour channels (not represented).

The amplifier 8 pre-forms the image signal, for instance by correlated double sampling.

The amplifier 8 also provides a gain controlled by gain control signal Gain received from a main controller 16. The main controller 16 generates the gain control signal Gain based on a value UI set by the user through a user interface 14.

Depending on the gain of the amplifier 8 (i.e. on the gain control signal Gain, or on the value indicative of the gain UI), the main processor computes a pulse height PH and transmits it to the pulse pattern generator 12.

The pulse height is determined as a decreasing function of the gain. For instance, the pulse height is computed with the following formula:

$PH(\text{Volts}) = 12 - \frac{1}{3} \cdot G$, where $G$ is the gain in $dB$.

As an alternative, the pulse height can be selected between a limited number of possible values depending on the gain: 12 V for a gain between 0 dB and 4 dB, 10 V between 4 dB and 10 dB, 8 V for more than 10 dB.

The pulse pattern generator 12 generates the driving signals Drv based on the signal PH received from the main controller 16. Notably, the pulse pattern generator 12 generates an image clock (image gate voltages) for the 3 CCD imagers (and notably for CCD imager 6) with a high level equal to the pulse height PH received from the main controller 16.

As another possibility which can be combined with the previous one, the storage clock has a pulse height having the value PH, and thus dependent on the gain.

Figure 2A:
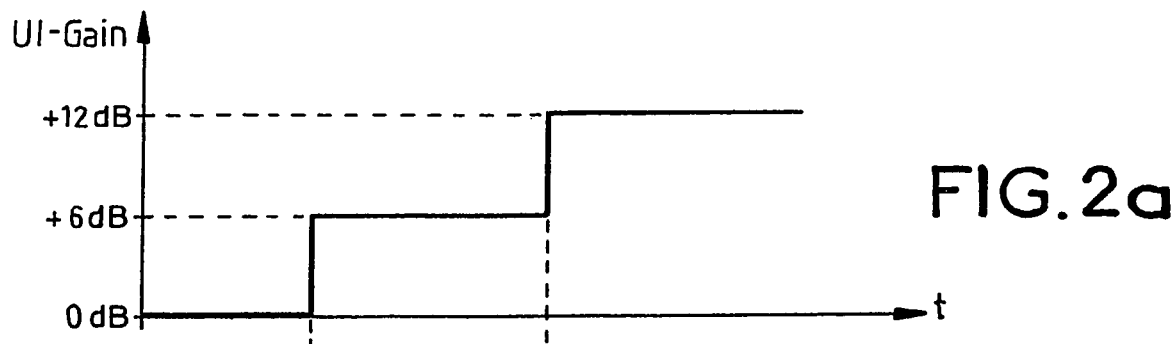
FIGS. 2a to 2c represents various signals involved in the invention.

FIG. 2a represents variations of the gain of the amplifier 8 in accordance with commands UI for the user. 1

Figure 2B:
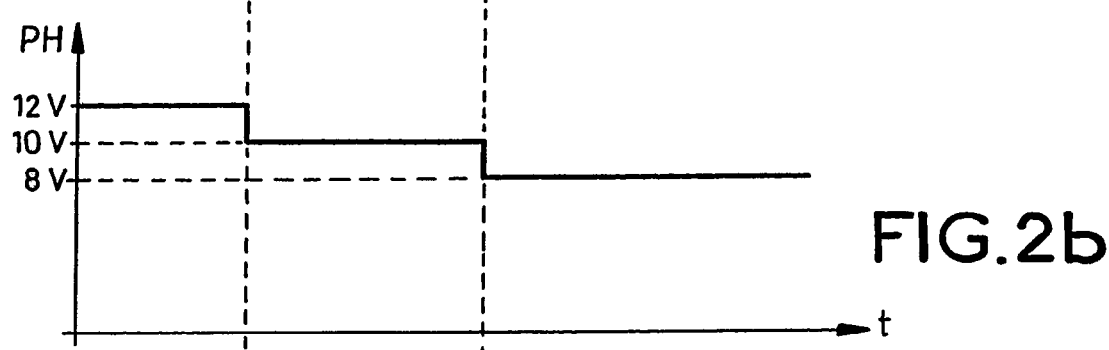

FIG. 2b represents the corresponding variations of the pulse height signal PH. As mentioned above, the pulse height signal PH is a decreasing function of the gain. Therefore, when the gain increases, the pulse height PH decreases.

Figure 2C:
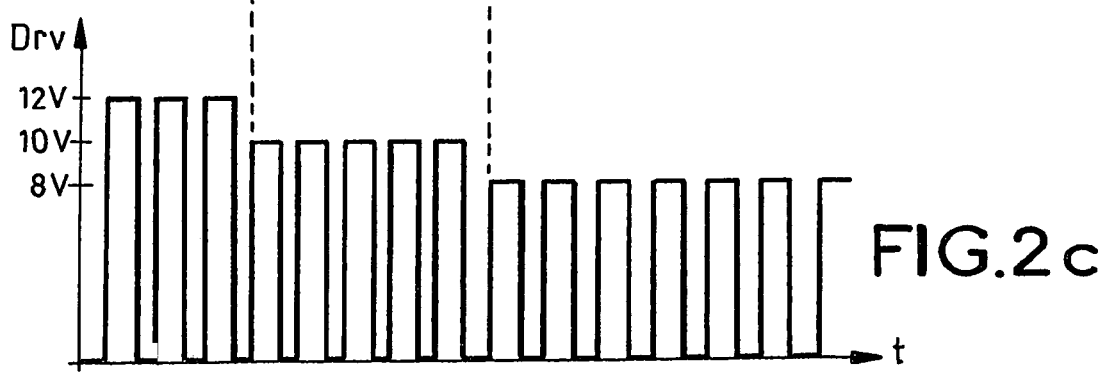

FIG. 2c represents the image clock driving signal Drv applied as a voltage to the image gate of the CCD imager 6. The driving signal is a train of pulses which height is determined by the value PH computed based on the gain. (FIG. 2c is explanative only; its timescale is not realistic.)

Other embodiments are naturally possible without departing from the scope of the present invention. For instance, the main controller 16 can transmit to the pulse pattern generator 12 a value indicative of the gain of the amplifier 8 and the pulse pattern generator 12 then computes the pulse height of the driving signal(s) based on this value.

According to another possible variation, the main controller 16 and the pulse pattern generator are made as a single entity, for instance as a single integrated circuit.

What is claimed is:

1. An image pickup device comprising:
   a CCD image sensor generating an image signal;
   driving means generating a driving signal for the image sensor;
   an amplifier for amplifying the image signal with a given gain;
   adjusting means to set the gain;
   control means for controlling the amplitude of the driving signal;
   wherein the control means is adapted to control a maximum output signal of the image sensor depending on the set gain of the amplifier by accordingly controlling the amplitude of the driving signal.

2. An image pickup device according to claim 1, wherein a pulse pattern generator includes the driving means.

3. An image pickup device according to claim 2, wherein the pulse pattern generator includes the control means.

4. An image pickup device according to claim 1, wherein a controller comprises the control means.

5. An image pickup device according to claim 1, wherein the driving signal is a storage clock signal or an image clock signal.

6. An image pickup device according to claim 1, comprising two further image sensors.

7. An image pickup device according to claim 1, wherein the amplitude of the driving signal is reduced with increasing gain.

8. An image pickup device comprising:
   a CCD image sensor generating an image signal;
   driving means generating a signal with pulses for driving the image sensor;
   an amplifier for amplifying the image signal with a given gain;
   adjusting means to set the gain;
   control means for setting the pulse height;
   wherein the control means is adapted to control a maximum output signal of the image sensor depending on the set gain of the amplifier by accordingly controlling the height of the pulses.

9. An image pickup device according to claim 8, wherein the driving signal is a storage clock signal or an image clock signal.

10. An image pickup device according to claim 8, wherein the height of the pulses is reduced with increasing gain.

11. A method for controlling an image pickup device comprising:
    generating an image signal in a CCD image sensor;
    setting a gain applied to the image signal;
    amplifying the image signal with the set gain;
    wherein the method further comprises:
    controlling a maximum output signal of the image sensor depending on the set gain of the amplifier by accordingly controlling the amplitude of the driving signal.

12. The method of claim 11, further comprising:
    reducing the amplitude of the driving signal with increasing gain.

* * * * *